United States Patent
Sharma

(10) Patent No.: US 10,116,648 B1
(45) Date of Patent: Oct. 30, 2018

(54) USER AUTHENTICATION

(71) Applicant: EMC Corporation, Hopkinton, MA (US)

(72) Inventor: Nagendra Gudibande Srikanta Sharma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 106 days.

(21) Appl. No.: 14/744,217

(22) Filed: Jun. 19, 2015

(51) Int. Cl.
*H04L 29/06* (2006.01)
*H04L 29/08* (2006.01)

(52) U.S. Cl.
CPC ............ *H04L 63/083* (2013.01); *H04L 67/10* (2013.01)

(58) Field of Classification Search
CPC .............................. H04L 63/083; H04L 67/10
See application file for complete search history.

(56) References Cited

U.S. PATENT DOCUMENTS

| | | | | |
|---|---|---|---|---|
| 2006/0282660 A1* | 12/2006 | Varghese | ............. | G06Q 20/341 713/155 |
| 2007/0118758 A1* | 5/2007 | Takahashi | ............. | G06F 21/305 713/186 |
| 2008/0028436 A1* | 1/2008 | Hannel | ............... | H04L 63/0218 726/1 |
| 2011/0010761 A1* | 1/2011 | Doyle | ................. | G06F 21/6218 726/5 |
| 2014/0180826 A1* | 6/2014 | Boal | .................. | G06Q 30/0245 705/14.66 |
| 2014/0373104 A1* | 12/2014 | Gaddam | ............... | H04L 63/205 726/4 |
| 2015/0213449 A1* | 7/2015 | Morrison | ........... | G06Q 20/4016 705/44 |
| 2016/0104132 A1* | 4/2016 | Abbatiello | ............. | G06Q 20/10 705/39 |

OTHER PUBLICATIONS

Hulsebosch et al., Context sensitive access control, Jun. 2005 SACMAT '05: Proceedings of the tenth ACM symposium on Access control models and\ technologies, Jun. 2005, ACM (Year: 2005).*
Julian Seifert et al., A context-sensitive security model for privacy protection on mobile phones, ACM, Sep. 2009 MobileHCI'09: Proceedings of the 11th International Conference on Human-Computer, Sep. 2009 (Year: 2009).*
Song Han et al., A framework of authentication and authorization for e-health services, ACM, Nov. 2006 SWS '06: Proceedings of the 3rd ACM workshop on Secure web services, Nov. 2006 (Year: 2006).*

* cited by examiner

*Primary Examiner* — Luu T Pham
*Assistant Examiner* — Harvey I Cohen
(74) *Attorney, Agent, or Firm* — Krishnedu Gupta; Jason A. Reyes

(57) ABSTRACT

There are disclosed herein techniques for use in authentication. In one embodiment, the techniques include a method comprising several steps. The method comprises receiving a request to access an application. The method also comprises determining a level of sensitivity associated with the application. The method further comprises selecting an authentication method based on the level of sensitivity. The method still further comprises utilizing the authentication method during an authentication operation to determine whether to grant access to the application.

11 Claims, 5 Drawing Sheets

USER AUTHENTICATION

TECHNICAL FIELD

The invention relates generally to user authentication. More specifically, the invention relates to a method, system and computer program product for use in the selection of an authentication method.

BACKGROUND OF THE INVENTION

In today's high-tech, fast-paced, hyper-connected world, people are spending more and more time on the internet to complete more of their daily activities such as online banking and shopping. The convenience afforded by the access and availability of the online world is, however, not without drawbacks. This increased access has brought with it an unparalleled growth in online fraudulent activity.

Generally, the approach to dealing with fraudulent activity has been to employ identity-based authentication systems to verify the identity of users before granting access to an access-controlled resource. One goal of such systems is to accurately determine user identity so that an unauthorized party cannot gain access. The system achieves this by applying an authentication method that requires a user response. The system aware of a correct response verifies the user response before granting access to the resource.

As will be appreciated, many systems employ a number of different authentication methods relating typically to something the user knows (e.g., password), something the user possesses (e.g., one-time passcode token), or something the user is (e.g., biometric). Each one of these authentication methods may be suitable at various times. However, existing systems may often select an inappropriate authentication method on a particular occasion. For example, the authentication method may be unsuitable given the nature of the request by the user. The authentication method may be too weak in certain instances due to the nature of the request.

Alternatively, as will also be appreciated, many systems may not select an authentication method at all in connection with some requests. For example, the systems may employ single sign-on (SSO) capabilities in which a user is allowed to log in once without being prompted to log in again. This may, however, present a problem if a first request for which authentication was approved is more begnin than a subsequent second request that is more sensitive.

There, therefore, exists a need for a solution to the above problems.

SUMMARY OF THE INVENTION

There is disclosed a method, comprising: receiving a request to access an application; determining a level of sensitivity associated with the application; based on the level of sensitivity, selecting an authentication method; and utilizing the authentication method during an authentication operation to determine whether to grant access to the application.

There is also disclosed a system, comprising: at least one processing device, said at least one processing device comprising a processor coupled to a memory; wherein the system is configured to: receive a request to access an application; determine a level of sensitivity associated with the application; based on the level of sensitivity, select an authentication method; and utilize the authentication method during an authentication operation to determine whether to grant access to the application.

There is further disclosed a computer readable medium having stored thereon computer executable instructions that when executed by a processor of a computer perform steps comprising: receiving a request to access an application; determining a level of sensitivity associated with the application; based on the level of sensitivity, selecting an authentication method; and utilizing the authentication method during an authentication operation to determine whether to grant access to the application.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
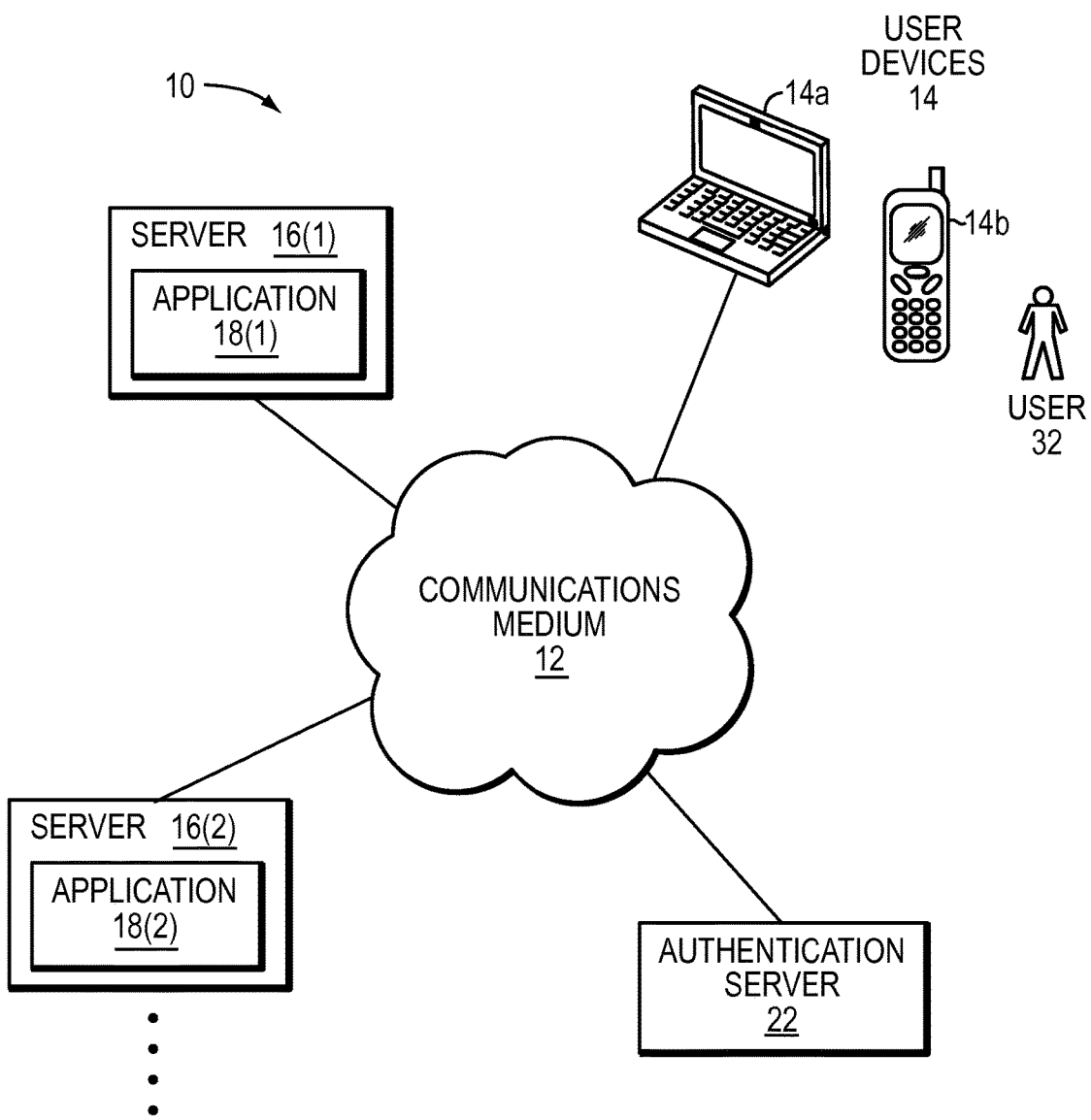
FIG. 1 is a block diagram of an electronic environment suitable for use in authentication.

FIG. 1 illustrates an electronic environment 10 for carrying out techniques described herein. Electronic environment 10 includes communications medium 12, user devices 14, servers 16(1), 16(2) . . . (collectively referenced by numeral 16), applications 18(1), 18(2) . . . (collectively referenced by numeral 18), and authentication server 22.

Communication medium 12 provides network connections between user devices 14, servers 18, and authentication server 22. Communications medium 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, communications medium 12 are capable of having a variety of topologies (e.g., queue manager-and-spoke, ring, backbone, multi drop, point to-point, irregular, combinations thereof, etc.).

User devices 14 include smartphones, personal digital assistants, laptop computers, tablet computers, and the like, constructed and arranged to communication with the servers 18 via communications medium 12. For example, user devices 14 may send requests to access the applications 16 hosted on the servers 18.

Servers 18 are constructed and arranged to host applications 16. Servers 18 are also constructed and arranged to receive requests to access the hosted applications 16 from user devices 14 via communications medium 12. Servers 18 are further constructed and arranged to send the requests to authentication server 22 via communications medium 12. Servers 18 are still further constructed and arranged to receive authentication results from authentication server 22 via communications medium 12.

Authentication server 22 is constructed and arranged to receive requests from servers 18 via communications medium 12. Authentication server 22 is also constructed and arranged to select authentication methods. Authentication server 22 is also constructed and arranged to perform authentication operations. Authentication server 22 is further constructed and arranged to send authentication results to servers 18 via communications medium 12.

During operation, a user 32 that seeks access to application 18(1) is required to submit a request to server 16(1) via one of the user devices 14. Server 18(1) responds by sending the request to the authentication server 22 with directions to perform a suitable authentication operation. It should be understood that in this embodiment the authentication operation is performed with a view to authenticate the authenticity of the request and/or the user 32. Authentication server 22 responds to the request by selecting an appropriate authentication method suitable for use in authentication. For example, the authentication method can relate to a password, a token passcode, a knowledge-based challenge, an out-of-band challenge, a split out-of-band challenge, etc. Once the authentication method is selected, the authentication server 22 performs an authentication operation by applying the selected authentication method to the user. The user 32 via the user device provides a user response to the authentication method. For example, the user may provide a response to a knowledge-based question. Here, the authentication server 22 may obtain information from database 78 (see FIG. 2) containing correct response. Authentication server 22 compares the received response and the correct response and generates an authentication result. This result is sent to the server 16. Based on the result, the server 16 grants or denies access to the application 18.

Figure 2:
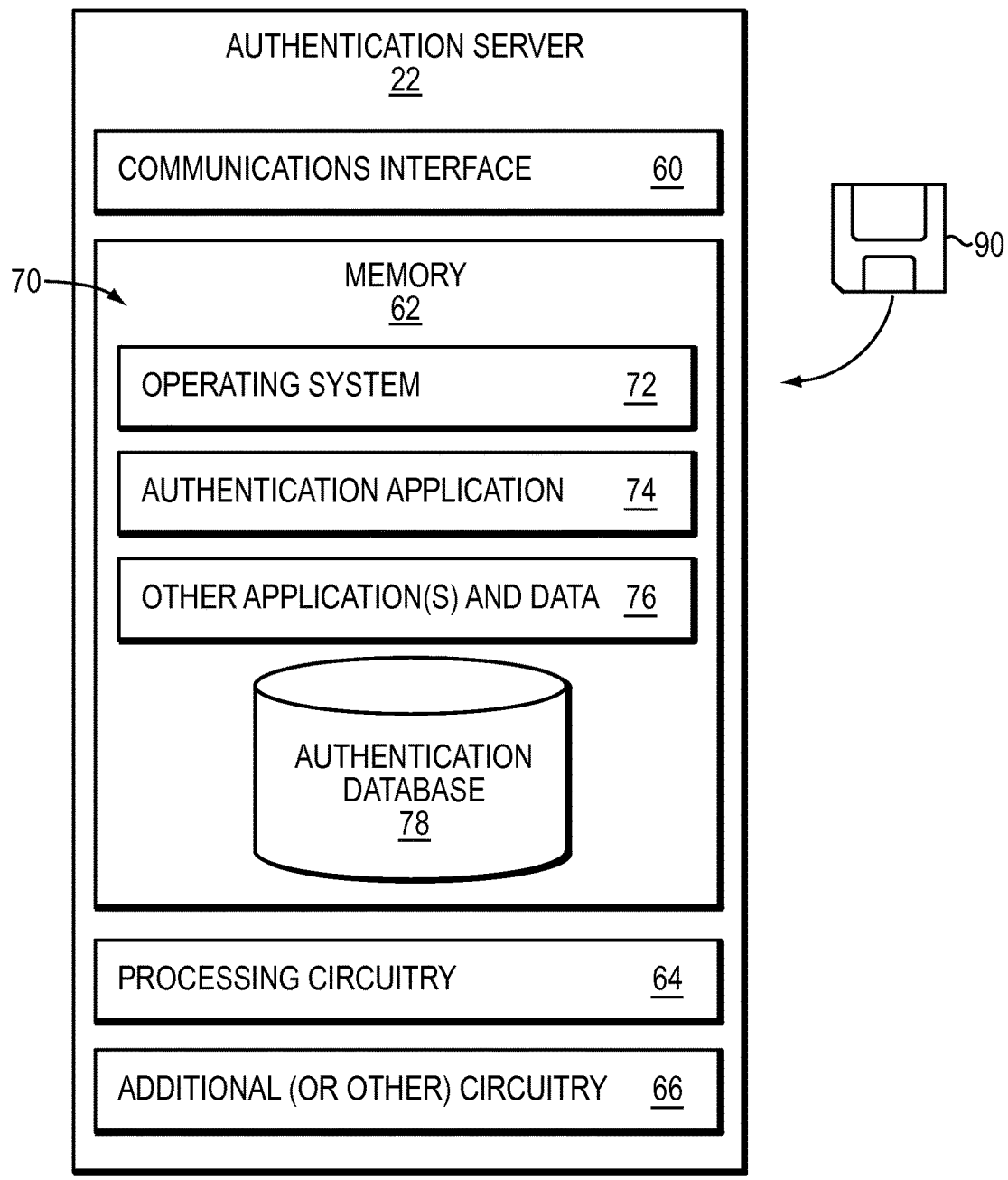
FIG. 2 is a block diagram of an authentication server of the electronic environment of FIG. 1.

FIG. 2 illustrates particular details of the authentication server 22 (also see FIG. 1). The authentication server 22 includes a communications interface 60, memory 62, processing circuitry 64, and additional (or other) circuitry 66.

The communications interface 60 is constructed and arranged to connect the authentication server 22 to the communications medium 12. Such communications may be IP-based, cellular-based, cable-based, combinations thereof, and so on. Accordingly, the communications interface 60 enables the authentication server 22 to communicate with user devices 14, servers 16 and other devices to perform user authentication.

The memory 62 is intended to represent both volatile storage (e.g., DRAM, SRAM, etc.) and non-volatile storage (e.g., flash memory, etc.). The memory 62 stores a variety of software constructs 70 including an operating system 72 to manage resources of the authentication server 22, a specialized authentication application 74 to perform authentication involving selection among different authentication methods, other applications and data 76 and an authentication database 78.

The processing circuitry 64 is constructed and arranged to operate in accordance with the various software constructs 70 stored in the memory 62. Such circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the authentication server 22. The computer program product 90 has a non-transitory (or non-volatile) computer readable medium which stores a set of instructions which controls one or more operations of the authentication server 22. Examples of suitable computer readable storage media include tangible articles of manufacture and apparatus which store instructions in a non-volatile manner such as CD-ROM, flash memory, disk memory, tape memory, and the like.

The additional circuitry 66 represents other portions of the authentication server 22. For example, the authentication server 22 may include a user interface to enable a user such as an administrator to enter input and receive output (user I/O) to operate the authentication server 22.

During operation, the processing circuitry 64 runs the authentication application 74 to form specialized control circuitry which selects authentication methods and performs authentication operations to authenticate the users 32. Such authentication may involve direct communication with the user devices, or indirect communication via other devices.

In particular, upon receipt of an authentication request, the control circuitry (i.e., the processing circuitry 64 executing the authentication application 74) determines the application 18 (see FIG. 1) for which access was requested. With the application known, the control circuitry performs a selection operation which selects, from the different available authentication methods which are available to the control circuitry for use in authentication, an authentication method to apply during user authentication. In particular, the control circuitry determines a pre-defined score for the application 18 from a profile (see FIG. 3) that may have been set by the administrator. For example, the administrator may set a pre-defined score for the application based on the sensitivity of the application and/or the data which the application serves. The control circuitry as a result is able to determine the appropriate sensitivity score for the application. Based on this sensitivity score, the control circuitry then performs a selection operation to select an appropriate authentication method from an authentication method classification (see FIG. 4). This will be described in further detail below.

Once the selection is finalized, the control circuitry of the authentication server 22 proceeds to perform an authentication operation which applies the selected authentication method to determine whether the user is authentic. In particular, the control circuitry obtains a response from the user 32 via the user device 14. If the response matches an expected response (e.g., data in the authentication database 78 in FIG. 2) within a predefined set of tolerances (e.g., 3% accuracy, 5% accuracy, etc. depending on the particular authentication method(s) being applied), authentication is successful. However, if the received response does not match the expected user data within the predefined set of tolerances, authentication is unsuccessful and access to the application is denied.

Figure 3:
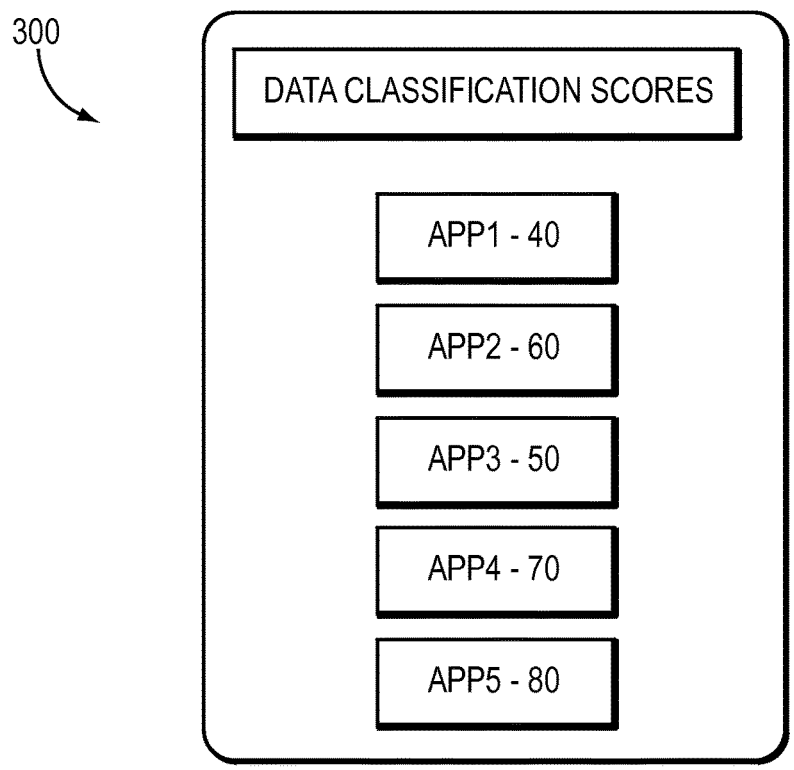
FIG. 3 is a block diagram of a sensitivity profile comprising sensitivity scores associated with applications hosted on servers of FIG. 1.

FIG. 3 illustrates a sensitivity profile 300 comprising sensitivity scores associated with applications hosted on servers of FIG. 1. Each application 18 hosted on server 16 in the environment 10 is assigned a sensitivity score or data classification score (hereinafter DCS). It should be appreciated that in this embodiment the DCS for each application is set by the administrator. The rule of thumb being the more sensitive the data the application is serving/protecting the higher the DCS. Assuming this rule of thumb is applied, the DCS for the applications are as follows: APP1—40, APP2—60, APP3—50, APP4—70, APP5—80. In other words, APP5 serves/protects the most sensitive data and APP1 serves/protects the least sensitive data. Additionally, the administrator may be required to set a DCS cut-off value, the value indicating that any application with a DCS above the cut-off value is highly sensitive. This will be described further below.

Figure 4:
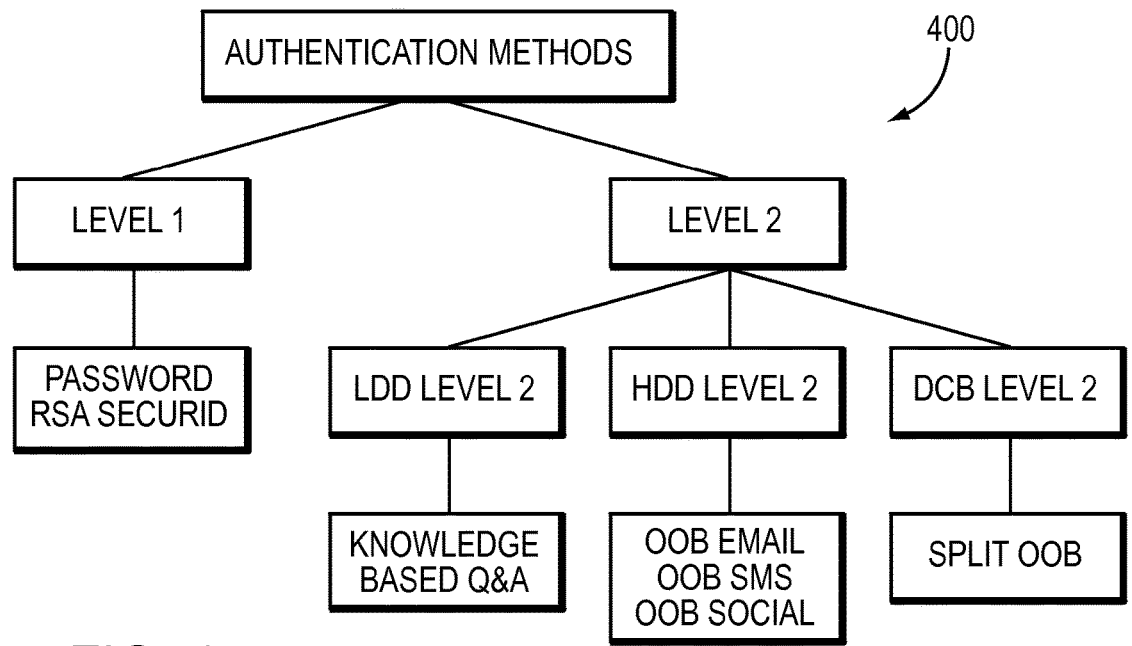
FIG. 4 is a block diagram of an authentication method classification classifying authentication methods according to the strength of the authentication methods.

FIG. 4 illustrates an authentication method classification 400 classifying authentication methods according to the strength of the authentication methods. The classification 400 comprises a LEVEL1 category having a first authentication method associated therewith. In this case, the first authentication method requires a password and/or a token passcode (e.g. RSA SECURID token) to facilitate authentication. It should be understood that the LEVEL1 category also comprises at least one rule and/or DCS(s) associated therewith. In at least one embodiment, the strength of the authentication method in the LEVEL1 category may be deemed low.

Accordingly, LEVEL1 may have a rule and/or DCS(s) associated therewith to indicate that the authentication method in this level is not very strong. For example, the rule may specify that if the DCS of the application is between 0 and 40, then the authentication method under LEVEL1 is to be selected. If the user subsequently requests access to an application that has a DCS according to the profile 300 between 0 and 40 the rule may be implemented resulting in the authentication method associated with this level been selected.

As illustrated, the classification 400 also comprises a LEVEL 2 category that is further divided into three sub-categories. The first sub-category is LDD LEVEL2 (Low DCS Difference Level2) having a second authentication method relating to a knowledge-based question associated therewith. The LDD LEVEL2 also comprises at least one rule and/or DCS(s) associated therewith. Here, the strength of the authentication method may be deemed higher than above resulting in the rule taking this into account. For example, if the DCS according to the profile 300 is between 40 and 65, the authentication method in this level should be selected.

The second sub-category is HDD LEVEL2 (High DCS Difference Level2) having a third authentication method associated therewith. In this embodiment, the third authentication method relates to an out-of-band authentication method. For example, the out-of-band authentication method may relate to SMS, email or social channels. The HDD LEVEL2 also has at least one rule and/or DCS associated therewith. The HDD LEVEL2 authentication method is stronger than LDD LEVEL2 and LEVEL1 authentication methods so this is taken into account. For example, if the DCS according to the profile 300 is between 65 and 75, the authentication method in this level should be selected.

The third sub-category is DCB LEVEL2 (DCS Cutoff Breach Level2) having a fourth authentication method associated therewith. The fourth authentication method relates to a split out-of-band authentication method. It should be understood that the split out-of-band authentication method comprises two or more parts sent over two or more channels (e.g., email and SMS). The idea behind this split out-of-band authentication method being that the probability of email being hacked and mobile phone being lost at the same time is considerably less. Thus, at least one rule and/or DCS associated with the level is configured for highly sensitive applications with a high DCS. The associated rule may state that if the DCS is above a cut-off or threshold then the split out-of-band authentication should be selected.

Figure 5:
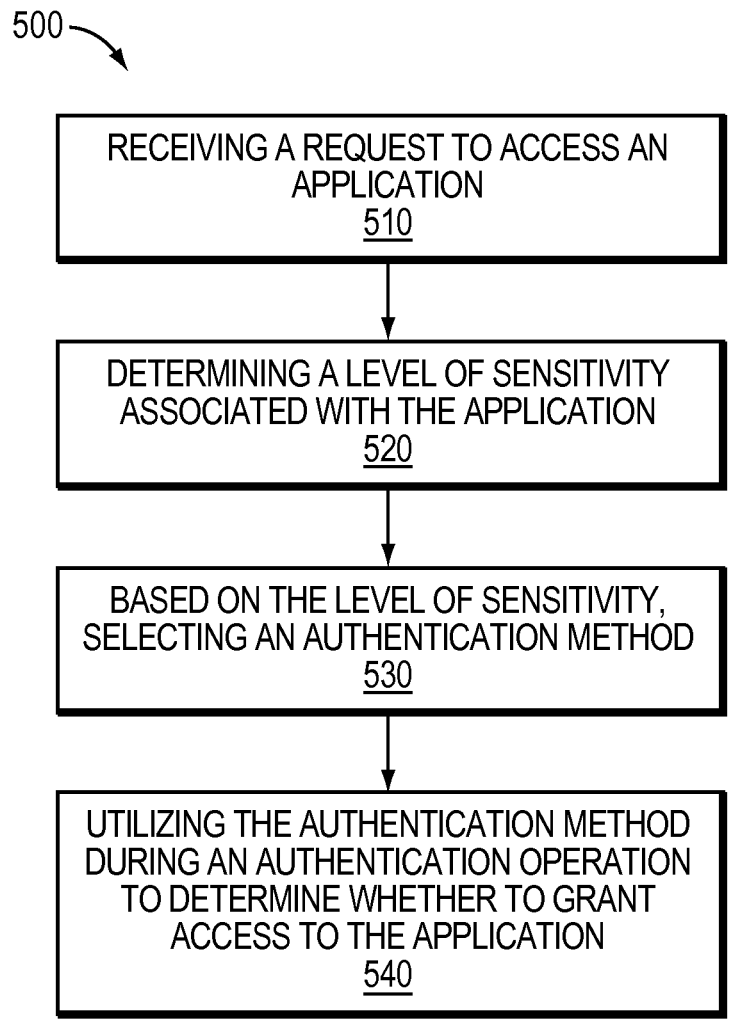
FIG. 5 is a flowchart of a procedure which is performed by the authentication server of FIG. 2.

FIG. 5 illustrates a flow chart of a process 500 in accordance with an embodiment. In the flow diagram, the operations are summarized in individual blocks. The operations may be performed in hardware, or as processor-executable instructions that may be executed by a processor. Furthermore, the process 500 may, but need not necessarily, be implemented in the environment 10 of FIG. 1.

At step 510, the process comprises receiving a request to access an application. For example, the request may originate from one of the user devices 14 and may seek access to one of the applications 18 hosted on servers 16.

At step 520, the process comprises determining a level of sensitivity associated with the application. As mentioned above, the profile 300 comprises DCS's associated with each of the applications 18 hosted on the servers 16. Thus, the step 520 identifies the application for which access was requested and determines the DCS in connection with the application from the profile. The DCS represents the level of sensitivity associated with the application.

At step 530, the method comprises selecting an authentication method based on the level of sensitivity. In this particular embodiment, the method applies at least one pre-defined rule for facilitating selection of the authentication method. For example, the method may apply a rule to identify the appropriate authentication method in the classification 400. As discussed above, the rule may state that if the DCS of the requested application lies in a range of DCS's, the authentication method associated with one of the LEVEL1 or LEVEL 2 authentication method should be selected. The method may apply this rule to select any one of the LEVEL1 or LEVEL2 authentication methods. Alternatively, as also discussed above, the rule may state if the DCS associated with the requested application is above a threshold or cut-off, the authentication method to be selected may be the split out-of-band authentication or another similar type of authentication method. On the other hand, if the user 32 has previously applied to one of the applications, the rule to be applied may require a comparison to be performed between the DCS's of the current and previous requests. Further, if the comparison indicates that the DCS of the previous request is greater than the DCS of the current request, then there is no need for further authentication and no authentication method is selected. However, if a differential between the two DCS's indicates that the current request has a greater DCS than the previous request, and the differential lies in a pre-defined range, then one of the LDD LEVEL2 and HDD LEVEL2 may be selected as the authentication method.

At step 540, the method comprises utilizing the authentication method during an authentication operation to determine whether to grant access to the application. In one embodiment, the authentication server performs an authentication operation involving the selected authentication method to determine the authenticity of the user from whom the request originated. As discussed above, the authentication server comprises the expected response, and compares the user response to the expected response. Authentication server will only grant access to the application if the expected response and the user response are similar or within a predefined tolerance.

In use, the predefined rules based on DCS may be configurable. For example, the rules may include the following:

If a user directly accesses any application with DCS between 0 and 40, then trigger LEVEL1 method if not already done.

If a user directly accesses any application with DCS above 40 and below or equal to 65, then trigger LDD LEVEL 2 method if not already done.

If a user directly accesses any application with DCS above 65 and below or equal to 75, then trigger HDD LEVEL 2 method if not already done.

If there is a DCS cut off breach (i.e., DCS cut-off value is 75), trigger DCB LEVEL2 method—split out-of-band authentication.

If there is a DCS difference of 25 or more between applications that are being accessed, then trigger one of HDD LEVEL2 methods. If already authenticated with one of HDD LEVEL2 methods, then check for time elapsed since it was done. If greater than 1 hour; trigger one more HDD LEVEL 2 method.

If there is a DCS difference of less than 25 between applications being accessed then trigger LDD LEVEL2 method.

Additionally, it should be understood that it may be mandatory to perform LEVEL1 authentication method. For example, DCS above cut-off, then perform LEVEL1 and DCB LEVEL2 authentication methods.

Assuming the above rules are in place, if user accesses APP1 (i.e., DCS 40), user gets prompted with one of LEVEL1 authentication methods. User completes authentication and gets access to APP1. User subsequently accesses APP2 (i.e., DCS 60). There is a difference in the DCS score between the application that the user has already accessed and the user is trying to access (DCS difference of 20). The DCS value of APP2 doesn't exceed the DCS cut off value of 75 and the DCS difference is less than 25 so LDD LEVEL2 method gets triggered (i.e., knowledge-based question). Subsequently, user accesses APP3 (i.e., DCS 50). Since the user now already has accessed APP2 with DCS 60 the user automatically gets access to APP3 which has a lower DCS. Subsequently, now accesses APP4 (i.e., DCS 70), and because the DCS is between 65 and 75, the HDD LEVEL2 method gets triggered. It can be any one of the authentication methods indicated in FIG. 4 under the HDD LEVEL2 category. Finally, user accesses APP5 (i.e., DCS 80) which exceeds the DCS cut-off of 75. Hence, the rules trigger DCB LEVEL2 authentication method which is split out-of-band authentication.

Advantageously, authentication and step up authentication methods are entirely based on sensitivity of content that the application is serving. Different categories of step up authentication methods are triggered based on DCS. Also, split out-of-band authentication makes use of a unique approach. An authentication code is split and sent across two or more channels which are independent of each other. The probability of both channels being compromised at same time is less. The security afforded by this authentication method is high. Additionally, it should be noted that traditional risk based step up authentication methods rely on risk calculation based on data sent from client. If the data is spoofed, risk calculation results in wrong scores. With DCS based approach, everything is pre-configured and doesn't rely on client data.

Furthermore, many organizations today adopt a hybrid approach that includes certain cloud services whilst maintaining and retaining some applications and services on premise. It will be understood that more often than not the most critical and sensitive stuff remains on premise while the trivial stuff gets pushed onto the cloud without much hesitation. However, the configuration of applications and which authentication methods to perform may all be done on a SSO provider admin console. The difficulty with this kind of approach is that a user may authenticate to an application serving trivial content and get SSO to an application serving more sensitive content without being challenged again. The solution described herein advantageously solves this problem by assigning each application with a data classification score (DCS) and making runtime decisions based on it.

It should be noted above that portions of the environment 10 of FIG. 1 may be implemented using one or more processing platforms. Illustrative embodiments of such platforms will now be described in greater detail.

Figure 6:
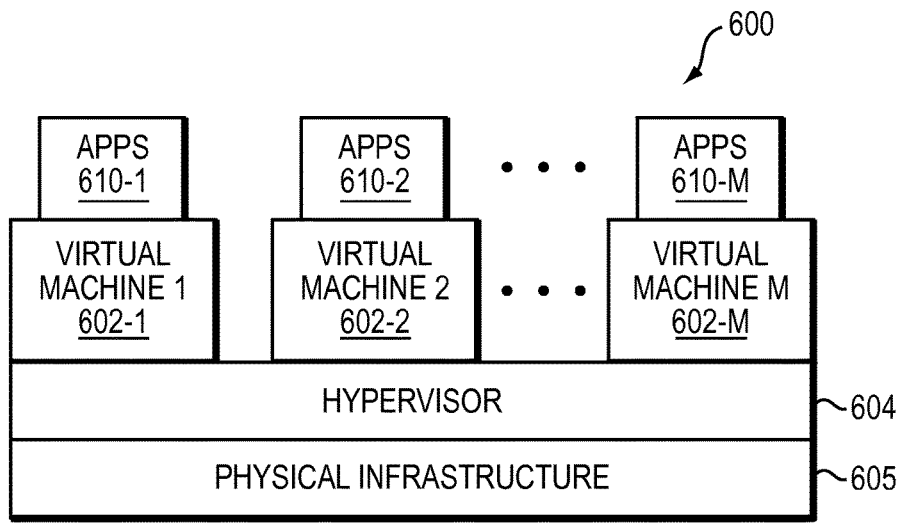
FIGS. 6 and 7 show examples of processing platforms that may be utilized to implement the electronic environment of FIG. 1.

As shown in FIG. 6, portions of the environment 10 may comprise cloud infrastructure 600. The cloud infrastructure 600 comprises virtual machines (VMs) 602-1, 602-2, . . . 602-M implemented using a hypervisor 604. The hypervisor 604 runs on physical infrastructure 605. The cloud infrastructure 600 further comprises sets of applications 610-1, 610-2, . . . 610-M running on respective ones of the virtual machines 602-1, 602-2, . . . 602-M under the control of the hypervisor 604.

Figure 7:
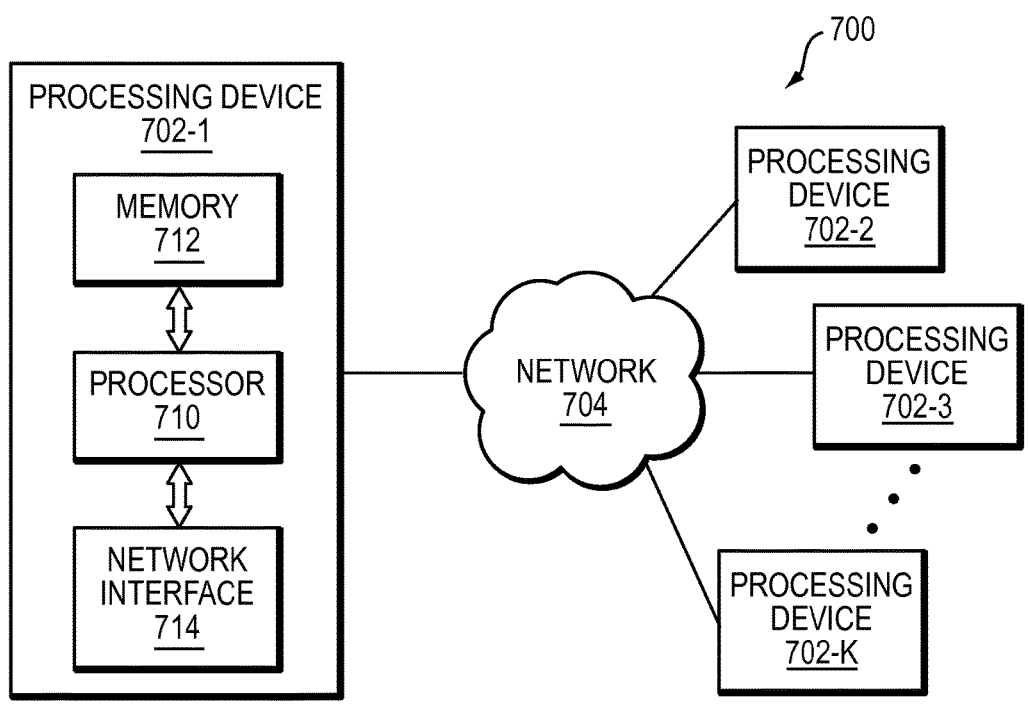

One or more processing modules or other components of environment 10 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of the system 100 and includes a plurality of processing devices, denoted 702-1, 702-2, 702-3, . . . 702-K, which communicate with one another over a network 704.

The network 704 may comprise any type of network, including by way of example a global computer network such as the Internet, a wide area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. The memory 712 may be viewed as an example of what is more generally referred to herein as a "computer program product" having executable computer program code embodied therein. Such a memory may comprise electronic memory such as random access memory (RAM), read-only memory (ROM) or other types of memory, in any combination.

The computer program code when executed by a processing device such as the processing device 702-1 causes the device to perform functions associated with one or more of the modules or other components of system. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within system.

Also included in the processing device 702-1 is network interface circuitry 714, which is used to interface the processing device with the network 704 and other system components. Such circuitry may comprise conventional transceivers of a type well known in the art.

The other processing devices 702 of the processing platform 700 are assumed to be configured in a manner similar to that shown for processing device 702-1 in the figure.

Again, the particular processing platform 700 shown in the figure is presented by way of example only, and system may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the system. Such components can communicate with other elements of the system over any type of network.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices and infrastructure arrangements. Numerous other embodiments within the scope of the appended claims will be readily apparent to those skilled in the art.

What is claimed is:

1. A method comprising steps of:
   receiving a request to access a first application on a device;
   determining a level of sensitivity associated with the first application in response to receiving the request, wherein the level of sensitivity is represented by a first sensitivity value;
   determining that access has previously been granted to a second application on the device or on another device, wherein the second application is different to the first application;
   determining a differential between the first sensitivity value and a second sensitivity value in connection with the second application, wherein the differential describes a difference in sensitivity between the first and second applications;
   determining that the first sensitivity value is within a predetermined sensitivity value range;
   selecting an authentication method for use as part of an authentication operation in connection with the request, wherein the selection of the authentication method is based on the determined differential and the said determination that the first sensitivity value is within the predetermined sensitivity value range; and
   applying the selected authentication method in connection with the request as part of an authentication operation that determines whether to grant the request to access the first application on the device;
   wherein the steps are performed by at least one processing device comprising a processor coupled to a memory.

2. The method as claimed in claim 1, wherein determining the level of sensitivity associated with the first application comprises:
   identifying the first application associated with the request; and
   determining the first sensitivity value in connection with the first application in order to facilitate selection of the authentication method.

3. The method as claimed in claim 1, wherein the determined level of sensitivity associated with the first application is represented by the first sensitivity value; and wherein selecting the authentication method comprises: comparing the differential to a threshold.

4. The method as claimed in claim 1, wherein the selected authentication method comprises at least one of a password, token code, knowledge based authentication method, biometric authentication method, out-of-band authentication method, and a split out-of-band authentication method.

5. A system, comprising:
   at least one processing device, said at least one processing device comprising a processor coupled to a memory;
   wherein the system is configured to:
   receive a request to access a first application on a device;
   determine a level of sensitivity associated with the first application in response to receiving the request, wherein the level of sensitivity is represented by a first sensitivity value;
   determine that access has previously been granted to a second application on the device or on another device, wherein the second application is different to the first application;
   determine a differential between the first sensitivity value and a second sensitivity value in connection with the second application, wherein the differential describes a difference in sensitivity between the first and second applications;
   determine that the first sensitivity value is within a predetermined sensitivity value range;
   select an authentication method for use as part of an authentication operation in connection with the request, wherein the selection of the authentication method is based on the determined differential and the said determination that the first sensitivity value is within the predetermined sensitivity value range; and
   apply the selected authentication method in connection with the request as part of an authentication operation that determines whether to grant the request to access the first application on the device.

6. The system as claimed in claim 5, wherein determining the level of sensitivity associated with the first application comprises:
   identifying the first application associated with the request; and
   determining the first sensitivity value in connection with the first application in order to facilitate selection of the authentication method.

7. The system as claimed in claim 5, wherein the determined level of sensitivity associated with the first application is represented by the first sensitivity value; and wherein selecting the authentication method comprises:
   comparing the differential to a threshold.

8. The system as claimed in claim 5, wherein the selected authentication method comprises at least one of a password, token code, knowledge based authentication method, biometric authentication method, out-of-band authentication method, and a split out-of-band authentication method.

9. A non-transitory computer-readable storage medium having stored thereon computer executable instructions that when executed by a processor of a computer perform steps comprising:
   receiving a request to access a first application on a device;

determining a level of sensitivity associated with the first application in response to receiving the request, wherein the level of sensitivity is represented by a first sensitivity value;

determining that access has previously been granted to a second application on the device or on another device, wherein the second application is different to the first application;

determining a differential between the first sensitivity value and a second sensitivity value in connection with the second application, wherein the differential describes a difference in sensitivity between the first and second applications;

determining that the first sensitivity value is within a predetermined sensitivity value range;

selecting an authentication method for use as part of an authentication operation in connection with the request, wherein the selection of the authentication method is based on the determined differential and the said determination that the first sensitivity value is within the predetermined sensitivity value range; and applying the selected authentication method in connection with the request as part of an authentication operation that determines whether to grant the request to access the first application on the device.

10. The non-transitory computer-readable storage medium as claimed in claim 9, wherein determining the level of sensitivity associated with the first application comprises:

identifying the first application associated with the request; and determining the first sensitivity value in connection with the first application in order to facilitate selection of the authentication method.

11. The non-transitory computer-readable storage medium as claimed in claim 9, wherein the determined level of sensitivity associated with the first application is represented by the first sensitivity value; and wherein selecting the authentication method comprises: comparing the differential to a threshold.

* * * * *